(12) United States Patent
Su et al.

(10) Patent No.: US 7,417,621 B2
(45) Date of Patent: Aug. 26, 2008

(54) OPTICAL MOUSE

(75) Inventors: Chun-Nan Su, Taipei (TW); Chin-Lung Lai, Taipei (TW)

(73) Assignee: Transpacific Plasma, LLC, Taipei (TW)

( * ) Notice: Subject to any disclaimer, the term of this patent is extended or adjusted under 35 U.S.C. 154(b) by 551 days.

(21) Appl. No.: 10/958,705

(22) Filed: Oct. 5, 2004

(65) Prior Publication Data

US 2005/0134560 A1 Jun. 23, 2005

(30) Foreign Application Priority Data

Nov. 17, 2003 (TW) .............................. 92132365 A

(51) Int. Cl.
*G09G 5/00* (2006.01)
(52) U.S. Cl. ...................... 345/156; 250/221
(58) Field of Classification Search ................ 250/205, 250/221; 345/156, 165, 167, 173, 179
See application file for complete search history.

(56) References Cited

U.S. PATENT DOCUMENTS

| | | | | |
|---|---|---|---|---|
| 4,521,772 A | * | 6/1985 | Lyon ........................... 345/166 |
| 5,541,623 A | * | 7/1996 | Engstrom ..................... 345/165 |
| 5,623,284 A | * | 4/1997 | Hsu et al. ..................... 345/166 |
| 5,914,484 A | * | 6/1999 | Tawarayama et al. ........ 250/205 |
| 6,417,846 B1 | * | 7/2002 | Lee ............................. 345/173 |
| 6,486,873 B1 | * | 11/2002 | McDonough et al. ........ 345/163 |
| 6,531,692 B1 | * | 3/2003 | Adan et al. .................. 250/221 |
| 6,611,921 B2 | | 8/2003 | Casebolt et al. |
| 6,697,053 B2 | * | 2/2004 | Kajihara ....................... 345/166 |
| 2001/0027530 A1 | | 10/2001 | Yen et al. |
| 2002/0070919 A1 | * | 6/2002 | Kajihara ....................... 345/166 |
| 2004/0160411 A1 | * | 8/2004 | Yang ............................ 345/156 |
| 2004/0189603 A1 | * | 9/2004 | Arrigo et al. ................. 345/158 |
| 2005/0110776 A1 | * | 5/2005 | Tan et al. ...................... 345/179 |
| 2005/0200606 A1 | * | 9/2005 | Willemin et al. ............. 345/166 |

* cited by examiner

*Primary Examiner*—Amare Mengistu
*Assistant Examiner*—Yuk Chow
(74) *Attorney, Agent, or Firm*—Workman Nydegger

(57) ABSTRACT

An illumination control device is used in an optical pointer to cooperate with an optical sensor module and a light-emitting device to emit proper illuminance of light. The illumination control device includes a microcontroller generating a supplemental current when the optical pointer is in a power-saving state; and a controlled current amplifier in communication with the microcontroller, the optical sensor module and the light-emitting device for providing an amplified current for the light-emitting device to emit light. The controlled current amplifier amplifies a synthesized current of a light-emitting current generated by the optical sensor module and the supplemental current generated by the microcontroller to obtain the amplified current when the optical pointer is in the power-saving state.

26 Claims, 3 Drawing Sheets

OPTICAL MOUSE

FIELD OF THE INVENTION

The present invention relates to an illumination control device, and more particularly to an illumination control device for use in an optical pointer device of a computer. The present invention also relates to an illumination control method for optimizing the illuminating pattern in an optical pointer device.

BACKGROUND OF THE INVENTION

Optical pointers such as optical mouse pointers have replaced the conventional rotating ball pointers and become the mainstream. Please refer to FIG. 1 which illustrates the operation of an optical mouse pointer. Principally, a visible light source 10, e.g. a light-emitting diode (LED), disposed in the lower part of the housing 1 illuminates on the plane 14 where the optical mouse rests. The light reflected by the plane 14 and focused by the lens 11. The focused light is transmitted to a photoelectric converter 12, e.g. a charge coupled device (CCD), to be converted into an electric signal. The electric signal corresponding to the image data of the illuminated portion of the plane 14 is then processed by a digital signal processor (DSP) 13 to realize the moving direction and distance of the optical mouse, and a control signal is generated to control the movement of the cursor on the computer display according to the moving direction and distance of the optical mouse on the plane 14. The lens 11, photoelectric converter 12 and digital signal processor 13 are usually integrated as an optical sensor module 15.

In order to achieve the purpose of saving power, the resulting current of the optical sensor module 15 for controlling the visible light source 10 is automatically reduced to lower the illuminance of the visible light source 10 when no movement of the optical mouse is detected for more than a preset period, e.g. a half second. In other words, the optical mouse enters a so-called power-saving state. Since the illuminance of the visible light source is at a low level in the power-saving state, the refreshingly movement of the optical mouse might be neglected particularly when the plane 14 has a less reflective surface or dark color. Therefore, the restore from the power-saving state to the working state might become lagged.

In order to avoid this problem, the illuminance of the visible light source 10 in the working state is raised in a prior art, thereby making the illuminance of the visible light source 10, although reduced in the power-saving state, is still sufficient for detecting the refreshingly movement of the optical mouse. The raised illuminance, however, may be adverse to the stipulation for eye safety. Moreover, the resulting current of the optical sensor module 15 in the suspending mode may exceed the upper limit generally required by a computer system for a general peripheral device.

SUMMARY OF THE INVENTION

The present invention is to provide illumination control device and method for use in an optical pointer device of a computer, which result in proper illuminance in both working state and power-saving state.

Therefore, the present invention provides an illumination control device for use in an optical pointer. The optical pointer comprises an optical sensor module and a light-emitting device. The illumination control device comprises a microcontroller generating a supplemental current when the optical pointer is in a power-saving state; and a controlled current amplifier in communication with the microcontroller, the optical sensor module and the light-emitting device for providing an amplified current for the light-emitting device to emit light, the controlled current amplifier amplifying a synthesized current of a light-emitting current generated by the optical sensor module and the supplemental current generated by the microcontroller to obtain the amplified current when the optical pointer is in the power-saving state.

In an embodiment, the microcontroller suspends the supplemental current when the optical pointer enters a working state from the power-saving state. The controlled current amplifier amplifies essentially the light-emitting current generated by the optical sensor module to obtain the amplified current when the optical pointer is in the working state.

Preferably, the light-emitting current generated by the optical sensor module in the working state is more intense than the synthesized current, and the synthesized current is more intense than the light-emitting current generated by the optical sensor module in the power-saving current.

In an embodiment, the microcontroller is electrically connected to the optical sensor module via a serial peripheral interface (SPI) pin and determines whether the optical sensor module is in the power-saving state by detecting an identifying signal on the serial peripheral interface (SPI) pin.

In an embodiment, the identifying signal is a value in an awaken-flag register of the optical sensor module.

In an embodiment, the microcontroller is electrically connected to the optical sensor module via an I/O pin and determines whether the optical sensor module is in the power-saving state by detecting the light-emitting current generated by the optical sensor module.

In an embodiment, the microcontroller detects the change of the light-emitting current flowing on a connecting pin between the optical sensor module and the controlled current amplifier via a first I/O pin to determine whether the optical sensor module is in the power-saving state. The supplemental current generated by the microcontroller is transmitted to the connecting pin between the optical sensor module and the controlled current amplifier via a second I/O pin to be synthesized with the light-emitting current.

In an embodiment, the controlled current amplifier includes a transistor having the base thereof electrically connected to the microcontroller and the optical sensor module, and the emitter-collector path thereof electrically connected to the light-emitting device in series.

In an embodiment, the microcontroller controls the supplemental current to increase from zero to a predetermined value in response to the decrease of the light-emitting current while the optical pointer is switching from a working state into the power-saving state.

In an embodiment, the microcontroller is electrically connected to the optical sensor module via an I/O pin, and an output voltage of the I/O pin is increased to provide the optical sensor module with a ground voltage of a high level so as to switch the optical sensor module off when the computer system that the optical pointer is applied to enters a standby mode.

The present invention further provides an illumination control method for use in an optical pointer. The optical pointer comprises an optical sensor module and a light-emitting device. The illumination control method comprises steps of: having the optical sensor module generating a power-saving current when the optical pointer is in a power-saving state, and generating a working current when the optical pointer is in a working state; adding a supplemental current to the power-saving current when the optical pointer is in the power-saving state, wherein a sum of the power-saving current and the supplemental current is less intense than the working current; and amplifying and providing the sum of currents for the light-emitting device to emit light when the optical pointer is in the power-saving state, and amplifying and providing the working current for the light-emitting device to emit light when optical pointer is in the working state.

In an embodiment, the illumination control method further comprises a step of providing a voltage of a high level for the optical sensor module as a ground voltage, thereby switching the optical sensor module off in a standby mode.

In an embodiment, the illumination control method further comprises a step of detecting an identifying signal on a serial peripheral interface (SPI) pin electrically connected to the optical sensor module to determine whether the optical sensor module is in the power-saving state. For example, the identifying signal is a value in an awaken-flag register of the optical sensor module.

In an embodiment, the illumination control method further comprises a step of detecting a current change generated by the optical sensor module to determine whether the optical sensor module is in the power-saving state.

In an embodiment, the supplemental current is increased from zero to a predetermined value in response to the decrease of a current generated by the optical sensor module while the optical pointer is switching from the working state into the power-saving state. On the other hand, the supplemental current is decreased from a predetermined value to zero in response to the increase of a current generated by the optical sensor module while the optical pointer is switching from the power-saving state into the working state.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
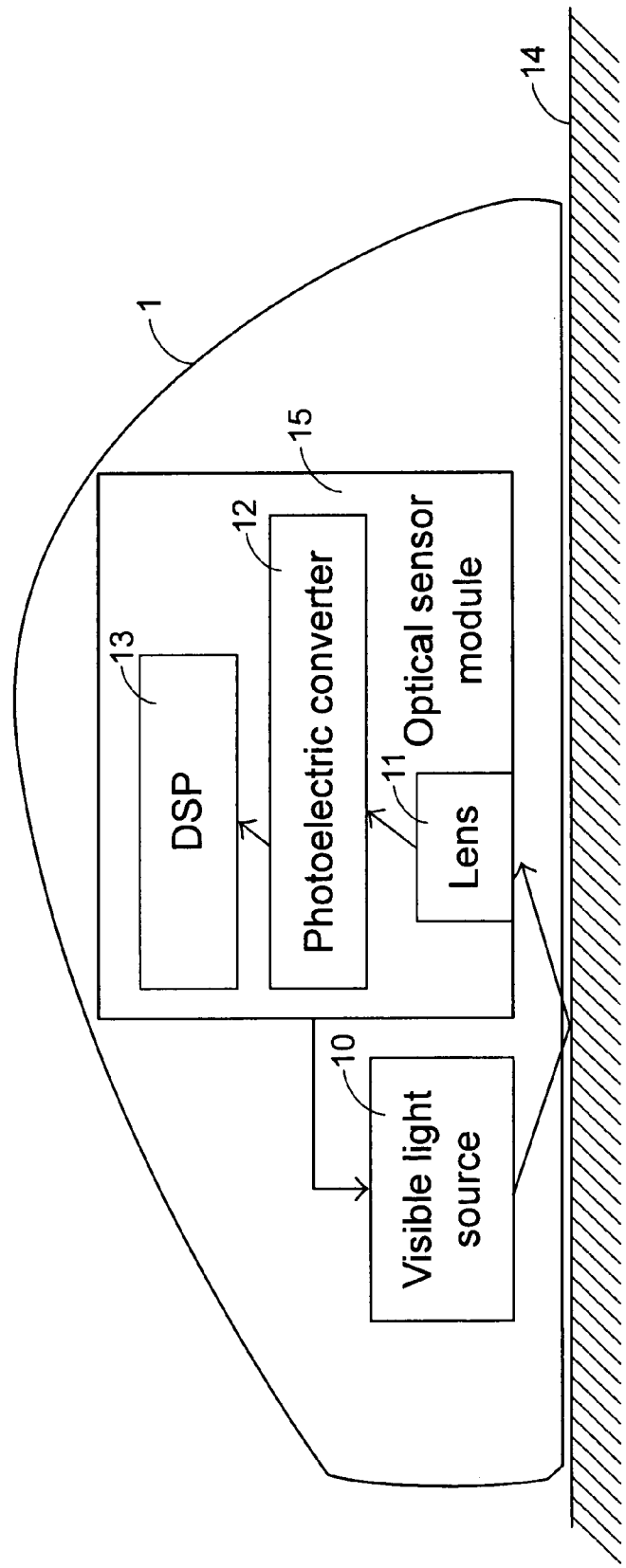
FIG. 1 is a schematic functional block diagram illustrating the operational principle of an optical mouse pointer.
Figure 2:
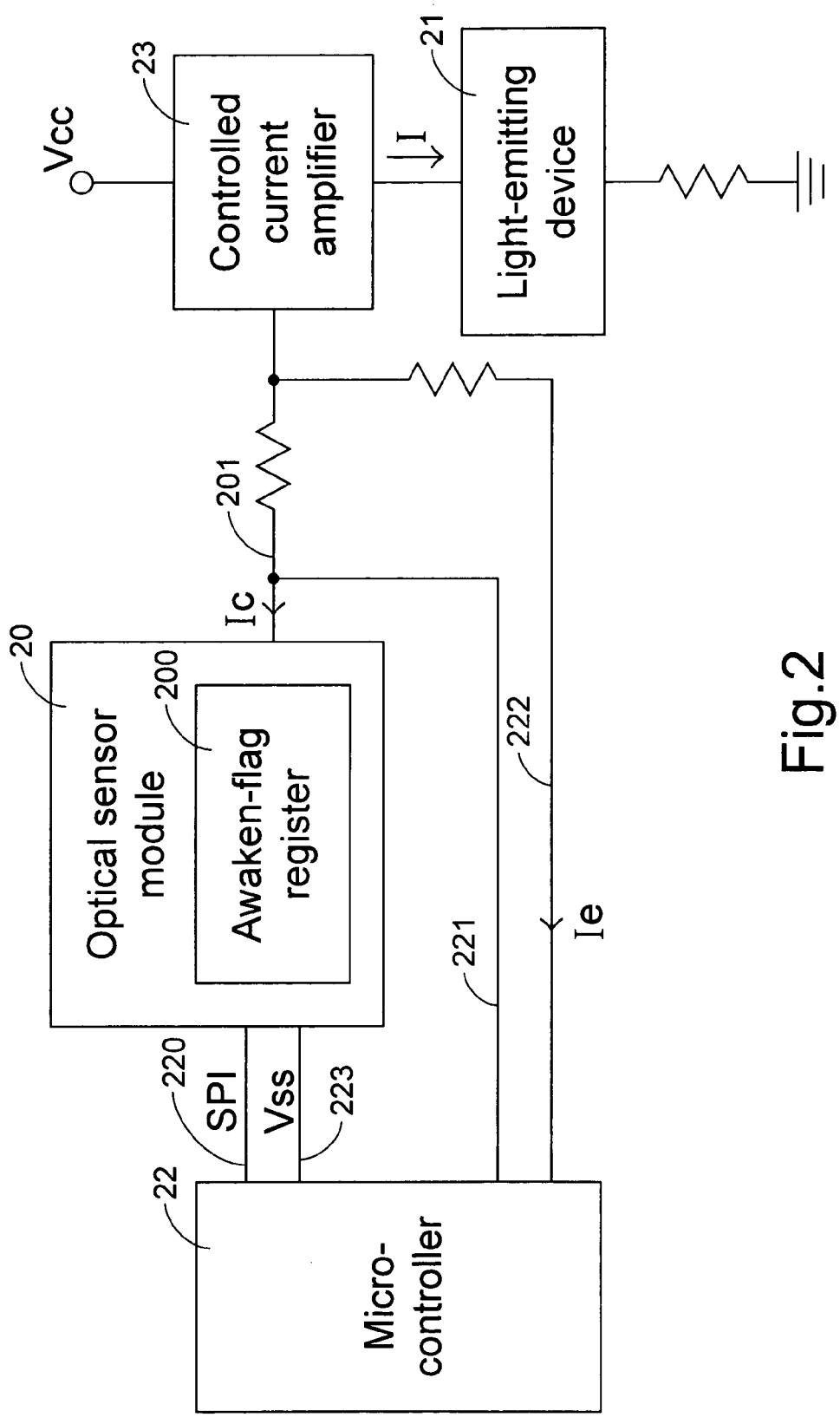
FIG. 2 is a circuit block diagram schematically showing the use of an illumination control device in an optical mouse pointer according to an embodiment of the present invention.

In order to provide proper illuminance in both working state and power-saving state, illumination control device and method according to the present invention are used with reference to FIG. 2. As shown in FIG. 2, the illumination control device according to the present invention works with the optical sensor module 20 and the light-emitting device 21 of an optical pointer to result in a working illuminance complying with the eye-safety requirement, or result in a power-saving illuminance capable of restoring the optical pointer from the power-saving state to the working state efficiently.

The illumination control device includes a microcontroller 22 and a controlled current amplifier 23. The microcontroller 22 is electrically connected to the optical sensor module 20 via a serial peripheral interface (SPI) pin 220 and an I/O pin 223. The controlled current amplifier 23 is electrically connected to the optical sensor module 20 via a connecting pin 201, and coupled to the light-emitting device 21. The microcontroller 22 is further electrically connected to the connecting pin 201 via I/O pins 221 and 222. Via the SPI pin 220, the microcontroller 22 reads a value in an awaken-flag register 200, in the optical sensor module 20. When the value is "1", it is determined that the optical pointer is in a normal working state, while a value "0" indicates that the optical pointer is in a power-saving state. Alternatively, the microcontroller 22 can determine whether the optical pointer is in a power-saving state via the I/O pin 221. When the light-emitting current Ic generated by the optical sensor module 20 is significantly decreased, the microcontroller 22 realizes that the power-saving state is entered.

When the optical pointer is switched from the working state to the power-saving state, the light-emitting current Ic generated by the optical sensor module 20 is decreased from a high intensity to a low intensity. Meanwhile, the microcontroller 22 provides a supplemental current Ie, which is increased from zero to a predetermined intensity, via the I/O pin 222. The supplemental current Ie is synthesized with the light-emitting current Ic, and the summed current is amplified by the controlled current amplifier 23. The amplified current is then provided for the light-emitting device 21 to emit light. On the other hand, when the optical pointer is switched from the power-saving state to the working state, the light-emitting current Ic generated by the optical sensnor module 20 is increased from the low intensity to the high intensity. Meanwhile, the microcontroller 22 decreases the supplemental current to zero. Accordingly, it is only the light-emitting current Ic of the high intensity amplified by the controlled current amplifier 23 and provided for the light-emitting device 21. It is understood that the intensity of the summed current in the power-saving state is still less than that of the only current in the working state. Since a supplemental current is provided according to the present invention, the illuminance in the power-saving state can be improved to a certain extent so as to efficiently detect the refreshingly movement of the optical pointer even when the plane where the optical pointer rests has a less reflective surface or dark color. Further, since the light-emitting current Ic is maintained unchanged, the intensity still complies with the eye-safety requirement.

When the computer system that the present illumination control device is applied to enters a standby state, the illumination control device also enters a standby state. In other words, the optical sensor module 20 should be switched off to save power. In order to achieve the purpose, the microcontroller 22 provides a ground voltage Vss for the optical sensor module 20 via the I/O pin 223. By increasing the output voltage of the I/O pin 223 up to for example 5 or 3.3 volts, the ground voltage is increased so as to shut the optical sensor module 20 off. In this way, the power-saving operation in the standby state can be performed without additional circuitry.

Figure 3:
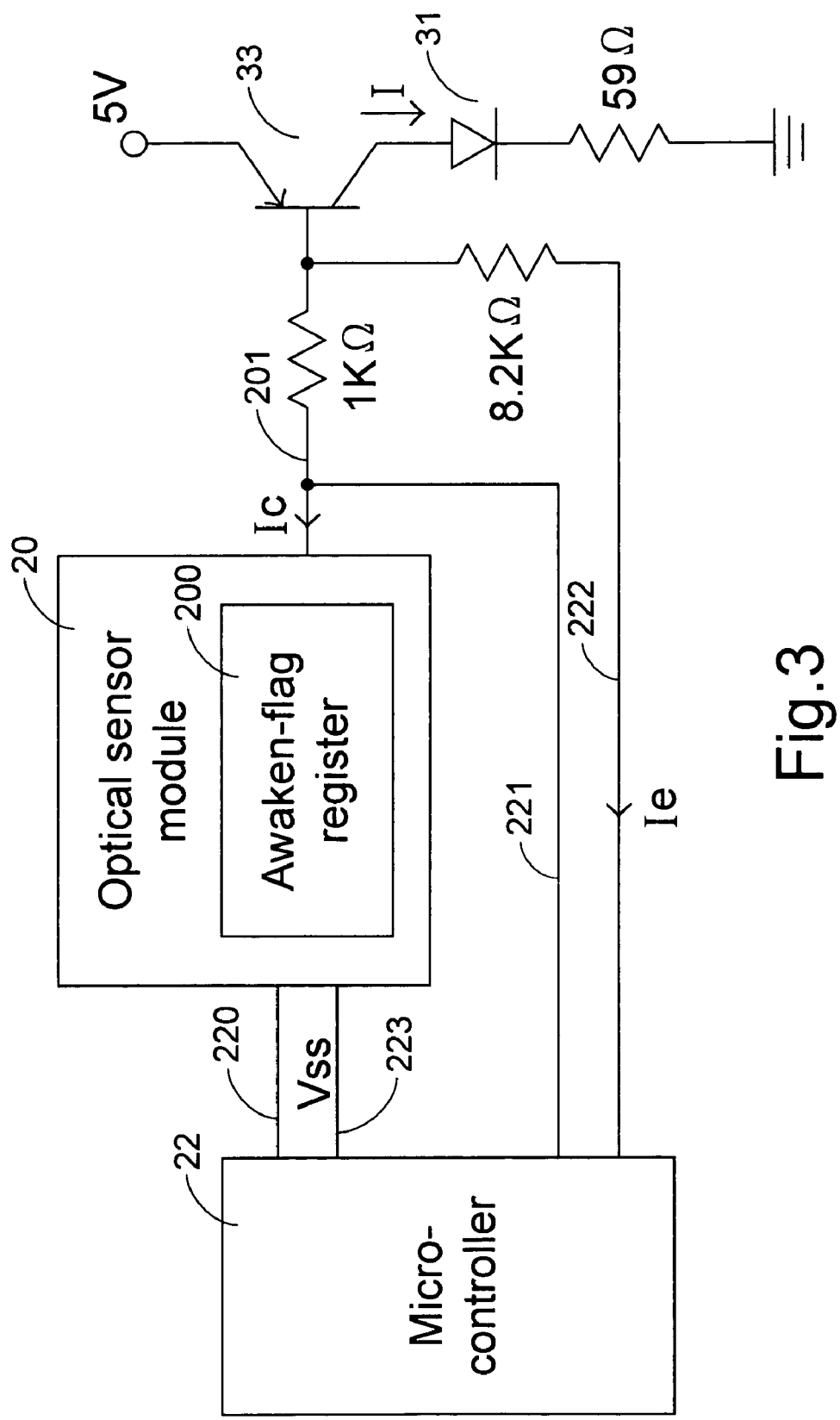
FIG. 3 is an exemplified circuitry diagram of the illumination control device of FIG. 2.

Referring to FIG. 3, an exemplified circuitry of the illuminance control device is shown. In the example, the light-emitting device 21 is implemented with a light-emitting diode 31. The controlled current amplifier 23 is implemented with a transistor 33, wherein the base of the transistor is electrically connected to the microcontroller 22 and the optical sensor module 20, and the emitter-collector path of the transistor 33 is electrically connected to the light-emitting diode 31 in series. In response to the synthesized currents Ic and Ie at the base thereof, the transistor 33 provides an amplified current for the light emitting diode 31 via the emitter-collector path thereof to emit light. As shown in FIG. 3, some parameters are also exemplified for design reference.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An illumination control device for use in an optical pointer, said optical pointer comprising an optical sensor module and a light-emitting device, said illumination control device comprising:
    a microcontroller configured to output a supplemental current when said optical pointer is in a power-saving state; and
    a controlled current amplifier in communication with said microcontroller, said optical sensor module and said light-emitting device configured to provide an amplified current for said light-emitting device to emit light, said controlled current amplifier configured to amplify a synthesized current of a light-emitting current output by said optical sensor module and said supplemental current output by said microcontroller to obtain said amplified current when said optical pointer is in said power-saving state.

2. The illumination control device according to claim 1 wherein said microcontroller is configured to suspend said supplemental current when said optical pointer enters a working state from said power-saving state.

3. The illumination control device according to claim 2 wherein said controlled current amplifier is configured to amplify essentially said light-emitting current output by said optical sensor module to obtain said amplified current when said optical pointer is in said working state.

4. The illumination control device according to claim 3 wherein said light-emitting current output by said optical sensor module in said working state is more intense than said synthesized current, and said synthesized current is more intense than said light-emitting current output by said optical sensor module in said power-saving state.

5. The illumination control device according to claim 1 wherein said microcontroller is electrically connected to said optical sensor module via a serial peripheral interface (SPI) pin and is configured to determine whether said optical sensor module is in said power-saving state by detecting an identifying signal on said serial peripheral interface (SPI) pin.

6. The illumination control device according to claim 5 wherein said identifying signal is a value in an awaken-flag register of said optical sensor module.

7. The illumination control device according to claim 1 wherein said microcontroller is electrically connected to said optical sensor module via an I/O pin and is configured to determine whether said optical sensor module is in said power-saving state by detecting said light-emitting current output by said optical sensor module.

8. The illumination control device according to claim 1 wherein said microcontroller is configured to detect the change of said light-emitting current flowing on a connecting pin between said optical sensor module and said controlled current amplifier via a first I/O pin to determine whether said optical sensor module is in said power-saving state.

9. The illumination control device according to claim 8 wherein said supplemental current output by said microcontroller is transmitted to said connecting pin between said optical sensor module and said controlled current amplifier via a second I/O pin to be synthesized with said light emitting current.

10. The illumination control device according to claim 1 wherein said controlled current amplifier includes a transistor having the base thereof electrically connected to said microcontroller and said optical sensor module, and the emitter-collector path thereof electrically connected to said light-emitting device in series.

11. The illumination control device according to claim 1 wherein said microcontroller controls said supplemental current to increase from zero to a predetermined value in response to the decrease of said light-emitting current while said optical pointer is switching from a working state into said power-saving state.

12. The illumination control device according to claim 1 wherein said microcontroller is electrically connected to said optical sensor module via an I/O pin, and an output voltage of said I/O pin is increased to provide said optical sensor module with a ground voltage of a high level so as to switch said optical sensor module off when the computer system that said optical pointer is applied to enters a standby mode.

13. An illumination control method for use in an optical pointer, said optical pointer comprising an optical sensor module and a light-emitting device, said illumination control method comprising:
    outputting a power-saving current when said optical pointer is in a power-saving state, and outputting a working current when said optical pointer is in a working state;
    adding a supplemental current to said power-saving current when said optical pointer is in said power-saving state, wherein a sum of said power-saving current and said supplemental current is less than said working current; and
    amplifying and providing said sum of currents for said light-emitting device to emit light when said optical pointer is in said power-saving state, and amplifying and providing said working current for said light-emitting device to emit light when optical pointer is in said working state.

14. The illumination control method according to claim 13 further comprising a step of providing a voltage of a high level for said optical sensor module as a ground voltage, thereby switching said optical sensor module off in a standby mode.

15. The illumination control method according to claim 13 further comprising a step of detecting an identifying signal on a serial peripheral inteface (SPI) pin electrically connected to said optical sensor module to determine whether said optical sensor module is in said power-saving state.

16. The illumination control method according to claim 15 wherein said identifying signal is a value in an awaken-flag register of said optical sensor module.

17. The illumination control method according to claim 13 further comprising a step of detecting a current change output by said optical sensor module to determine whether said optical sensor module is in said power-saving state.

18. The illumination control method according to claim 13 wherein said supplemental current is increased from zero to a predetermined value in response to the decrease of a current output by said optical sensor module while said optical pointer is switching from said working state into said power-saving state.

19. The illumination control method according to claim 13 wherein said supplemental current is decreased from a predetermined value to zero in response to the increase of a current output by said optical sensor module while said optical pointer is switching from said power-saving state into said working state.

20. An illumination control device for use in an optical pointer, the optical pointer comprising an optical sensor module and a light-emitting device, the illumination control device comprising:

a microcontroller outputting a supplemental current when the optical pointer is in a power-saving state;

a means for synthesizing a light-emitting current output by the optical sensor module and the supplemental current output by the microcontroller to obtain a synthesized current when the optical pointer is in the power-saving state; and a means for coupling the synthesized current to the light-emitting device.

21. The illumination control device of claim 20, wherein the means for coupling the synthesized current to the light-emitting device is a controlled current amplifier in communication with the microcontroller, the optical sensor module, and the light-emitting device, the controlled current amplifier receiving the synthesized current, amplifying the synthesized current to produce an amplified current, and coupling the amplified current to the optical pointer.

22. The illumination control device of claim 20, wherein the microcontroller suspends the supplemental current when the optical pointer is not in the power-saving state.

23. The illumination control device of claim 20, wherein the light-emitting current output by the optical sensor module in the working state is greater than the synthesized current when the optical pointer is in the power-saving state, and the synthesized current is greater than the light-emitting current output by the optical sensor module in the power-saving state.

24. The illumination control device of claim 20, wherein the optical sensor module produces an output indicating whether it is in the power-saving or working state, the microcontroller operable to receive the output and determine therefrom whether said optical sensor module is in the power-saving state.

25. The illumination control device of claim 23, wherein the output corresponds to a value stored in a register within the optical sensor module.

26. The illumination control device of claim 20, wherein the microcontroller is operable to detect the light-emitting current output by the optical sensor module and is further operable to determine whether the optical sensor module is in the power-saving state by measuring the light-emitting current output by the optical sensor module.

* * * * *